(12) United States Patent
Kim

(10) Patent No.: US 12,216,095 B2
(45) Date of Patent: Feb. 4, 2025

(54) DROP TEST DEVICE AND DROP TEST METHOD USING THE SAME

(71) Applicant: Samsung Display Co., Ltd., Yongin-Si (KR)

(72) Inventor: Gabtae Kim, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 68 days.

(21) Appl. No.: 17/541,654

(22) Filed: Dec. 3, 2021

(65) Prior Publication Data

US 2022/0317005 A1 Oct. 6, 2022

(30) Foreign Application Priority Data

Apr. 5, 2021 (KR) .................. 10-2021-0044182

(51) Int. Cl.
*G01M 7/08* (2006.01)
*G01N 3/30* (2006.01)
*G01N 3/303* (2006.01)

(52) U.S. Cl.
CPC ....... *G01N 3/303* (2013.01); *G01N 2203/001* (2013.01); *G01N 2203/026* (2013.01); *G01N 2203/04* (2013.01)

(58) Field of Classification Search
CPC ........................................... G01N 2203/0262
See application file for complete search history.

(56) References Cited

U.S. PATENT DOCUMENTS

| 7,966,861 B2 | 6/2011 | Yee et al. |
| 2009/0165532 A1* | 7/2009 | Yee ................ G01N 3/303 73/12.09 |

FOREIGN PATENT DOCUMENTS

| CN | 102902308 B | * | 8/2016 | .......... G06F 1/1624 |
| CN | 110174230 A | * | 8/2019 | |
| KR | 100908725 B1 |  | 7/2009 | |
| KR | 100913182 B1 |  | 8/2009 | |
| KR | 101098769 B1 |  | 12/2011 | |
| KR | 20140101247 A | * | 8/2014 | |
| WO | WO-2019097569 A1 | * | 5/2019 | |

OTHER PUBLICATIONS

Title: "Apple iPad—Turn Picture in Picture On / Off"; URL: https://www.verizon.com/support/knowledge-base-184033/ ; Year: 2020 (Year: 2020).*

* cited by examiner

*Primary Examiner* — Jill E Culler
*Assistant Examiner* — Ruben C Parco, Jr.
(74) *Attorney, Agent, or Firm* — CANTOR COLBURN LLP

(57) ABSTRACT

A drop test device includes a clamp that grips a falling body and that drops the falling body by releasing, by a predetermined operation, a gripping force applied to the falling body and an impact plate having an impact surface with which the falling body collides. The falling body includes a display module that operates in a first mode and a second mode and a jig to which the display module is coupled. The jig includes a first jig to which the display module in the first mode is coupled and a second jig to which the display module in the second mode is coupled.

7 Claims, 15 Drawing Sheets

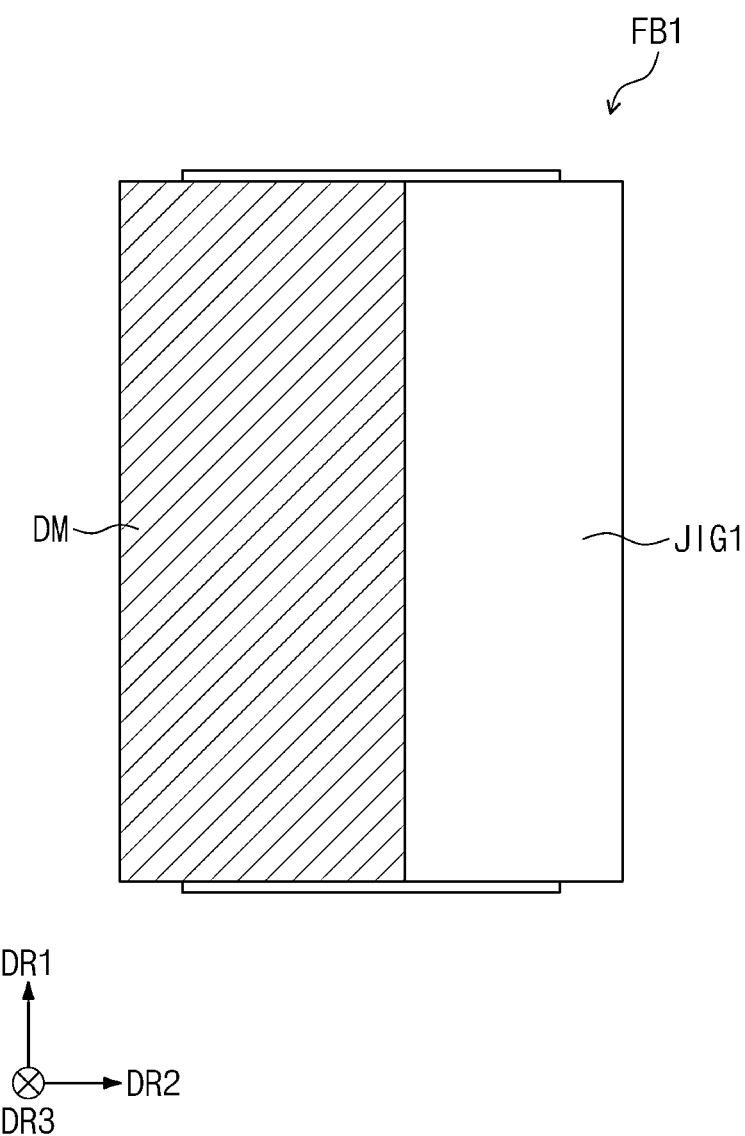

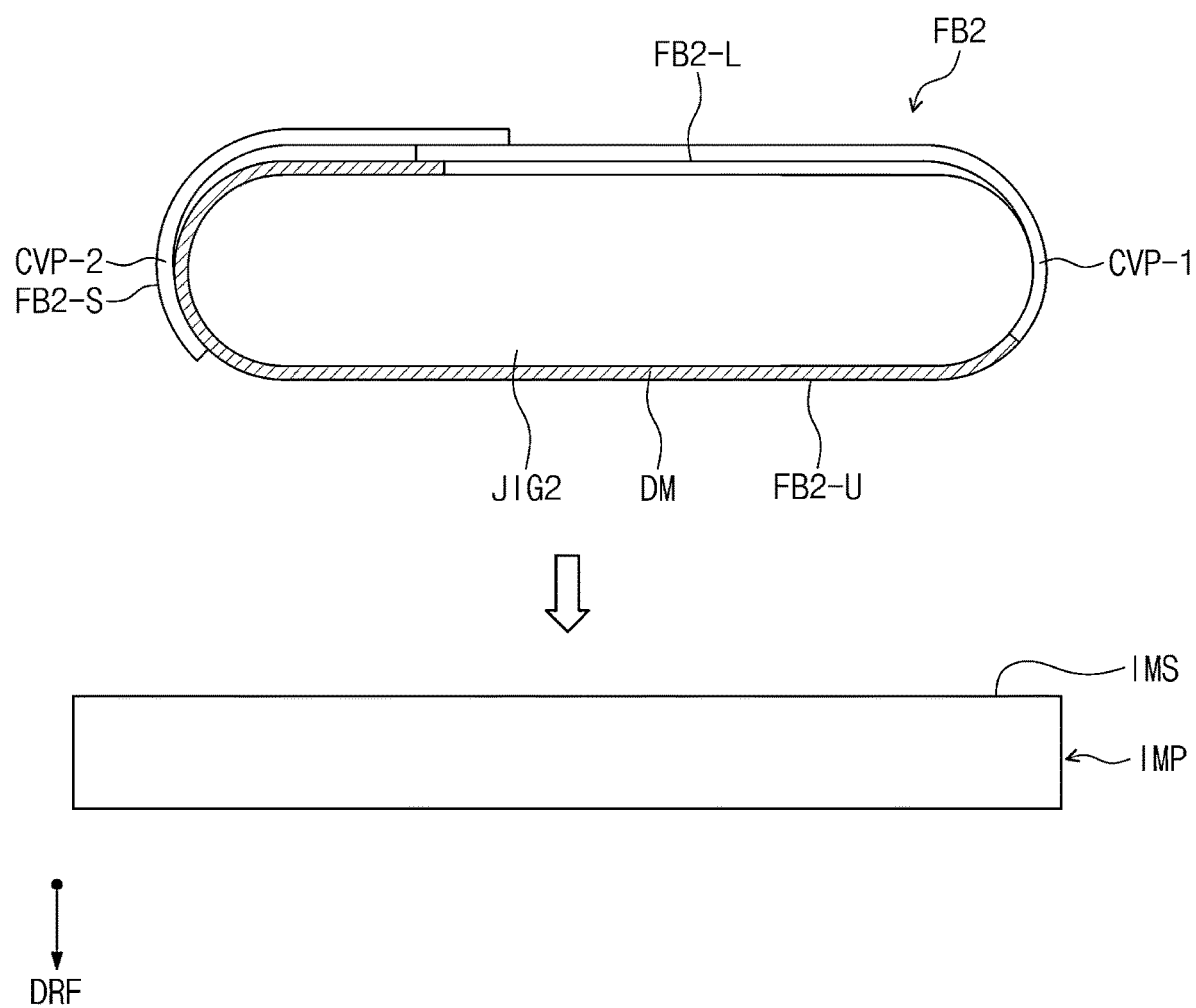

DROP TEST DEVICE AND DROP TEST METHOD USING THE SAME

This application claims priority to Korean Patent Application No. 10-2021-0044182 filed on Apr. 5, 2021, and all the benefits accruing therefrom under 35 U.S.C. § 119, the content of which in its entirety is herein incorporated by reference.

BACKGROUND

1. Field

Embodiments of the invention described herein relate to a drop test device and a drop test method using the same, and more particularly, relate to a drop test device for improving reliability of a display module to be evaluated and a drop test method using the drop test device.

2. Description of the Related Art

Electronic devices, such as a computer, a navigation device, a smart television, and the like, include a display device for displaying an image. The display device generates an image and provides the generated image to a user through a display screen.

Recently, with a development of display device technologies, various forms of display devices are being developed. A flexible display device that can be folded or retracted is being developed, for example. The flexible display device, the shape of which may be variously changed, may be easy to carry and may improve user convenience.

The flexible display device may provide display screens of various sizes to a user. The flexible display device may operate in a default mode and an extension mode, for example. In the default mode, the flexible display device may be provided in a state in which part of a flexible display module is exposed and the rest is retracted in a case. The retracted part may be extended in the extension mode.

As the flexible display device operates in various modes, a durability evaluation environment for the display module that is similar to the environment in which the flexible display device operates in the various modes is desired.

SUMMARY

Embodiments of the invention provide a drop test device for determining whether a display module operating in a plurality of modes has a defect depending on drop.

Embodiments of the invention provide a drop test method that matches an environment in which a display module operating in a plurality of modes is actually used and that is capable of determining the occurrence or non-occurrence of a defect.

In an embodiment of the invention, a drop test device includes a clamp that grips a falling body and that drops the falling body by releasing, by a predetermined operation, a gripping force applied to the falling body and an impact plate having an impact surface with which the falling body collides. The falling body includes a display module that operates in a first mode and a second mode and a jig to which the display module is coupled. The jig includes a first jig to which the display module in the first mode is coupled and a second jig to which the display module in the second mode is coupled.

In an embodiment, each of the first jig and the second jig may have a plate shape parallel to a plane defined by a first direction and a second direction crossing the first direction, and the second jig may have a greater width in the second direction than a width of the first jig.

In an embodiment, the falling body may further include a cover coupled to a lower portion of the display module and a lower portion of the jig. Each of the first jig and the second jig may include an upper surface on which the display module is disposed and a lower surface that faces the upper surface. The cover may cover at least part of the lower surface.

In an embodiment, each of the first jig and the second jig may further include a side surface that connects the upper surface and the lower surface. The side surface may include a long side surface extending in the first direction and a short side surface extending in the second direction. The cover may cover at least part of the long side surface.

In an embodiment, the long side surface may include a first long side surface and a second long side surface that faces the first long side surface. The cover may include a first cover that covers the first long side surface and a second cover that covers the second long side surface.

In an embodiment, an area by which the first cover and the second cover coupled to the second jig overlap each other in a plan view may be smaller than an area by which the first cover and the second cover coupled to the first jig overlap each other in the plan view.

In an embodiment, the display module may include a first display portion and a second display portion adjacent to the first display portion. In the first mode, the first display portion may define a display area of the display module. In the second mode, the first display portion and the second display portion may define the display area.

In an embodiment, the display module may further include a rolling portion adjacent to the second display portion. In the first mode, the rolling portion may be disposed under the first jig. In the second mode, the rolling portion may be disposed on a side surface of the second jig.

In an embodiment, the display module may further include an adhesive portion that is adjacent to the rolling portion and that is attached to a lower surface of each of the first jig and the second jig.

The drop test device may further include a support to which the clamp is connected, the support having a predetermined height along a direction in which the falling body drops.

In an embodiment, the impact plate may include granite or metal.

In an embodiment, a drop test method for evaluating drop impact by dropping each of a first falling body and a second falling body includes gripping, by a clamp, the first falling body or the second falling body, dropping the first falling body or the second falling body by releasing a gripping force applied to the first falling body or the second falling body, and causing the dropped first falling body or the dropped second falling body to collide with an impact plate. The first falling body includes a first jig and a display module in a first mode, the display module being coupled to an upper portion of the first jig. The second falling body includes a second jig and the display module in a second mode different from the first mode, the display module being coupled to an upper portion of the second jig.

In an embodiment, the first falling body may include a first falling upper surface on which the display module is disposed and a first falling lower surface that faces the first falling upper surface. The second falling body may include a second falling upper surface on which the display module is disposed and a second falling lower surface that faces the second falling upper surface. The dropping the first falling body may include dropping the first falling body such that the first falling upper surface collides with the impact plate and dropping the first falling body such that the first falling lower surface collides with the impact plate. The dropping the second falling body may include dropping the second falling body such that the second falling upper surface collides with the impact plate and dropping the second falling body such that the second falling lower surface collides with the impact plate.

In an embodiment, the first falling body may further include a first falling side surface that connects the first falling upper surface and the first falling lower surface. The second falling body may further include a second falling side surface that connects the second falling upper surface and the second falling lower surface. The dropping the first falling body may further include dropping the first falling body such that the first falling side surface collides with the impact plate. The dropping the second falling body may further include dropping the second falling body such that the second falling side surface collides with the impact plate.

In an embodiment, each of the first falling body and the second falling body may further include a cover. In the first falling body, the cover may be disposed on the first falling side surface and the first falling lower surface. In the second falling body, the cover may be disposed on the second falling side surface and the second falling lower surface.

In an embodiment, the second falling body may have a greater width in a second direction than a width of the first falling body.

In an embodiment, the drop test method may further include evaluating drop impact by dropping the first falling body and evaluating drop impact by dropping the second falling body after the dropping the first falling body.

BRIEF DESCRIPTION OF THE DRAWINGS

The above and other objects and features of the invention will become apparent by describing in detail embodiments thereof with reference to the accompanying drawings.

FIGS. 4A and 4B are rear views illustrating an embodiment of some components of the falling bodies evaluated by the drop test device according to the invention.

FIGS. 7A to 7C are cross-sectional views illustrating an embodiment of some operations of the drop test method.

DETAILED DESCRIPTION

Figure 1:
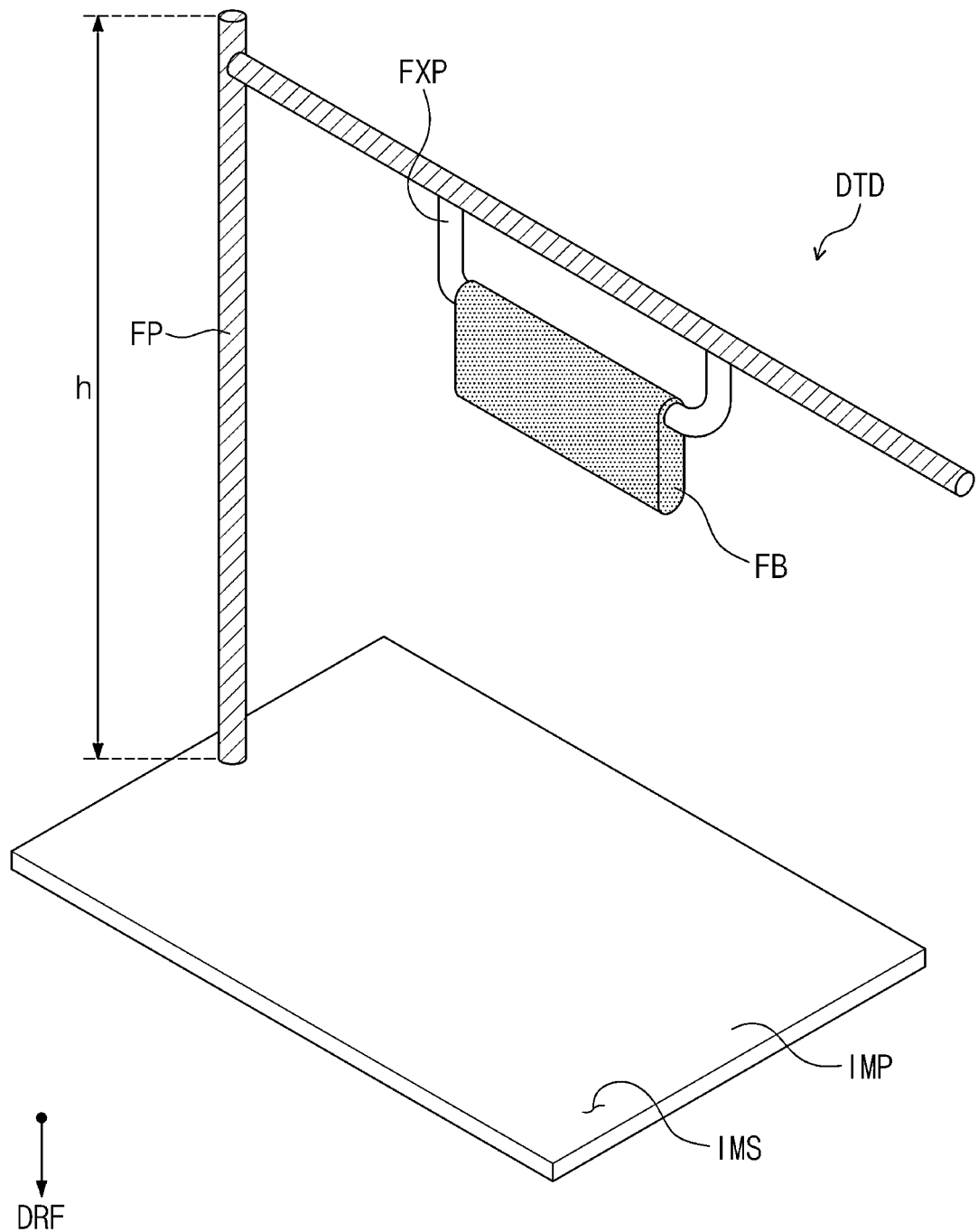
FIG. 1 is a perspective view of an embodiment of a drop test device according to the invention.

In this specification, when it is mentioned that a component (or, an area, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description. As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the invention, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

The expression "directly disposed" used herein may mean that there is no additional layer, film, area, or plate between one portion, such as a layer, a film, an area, or a plate, and another portion. For example, the expression "directly disposed" may mean that two layers or two members are disposed without an additional member such as an adhesive member therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms used herein, including technical or scientific terms, have the same meanings as those generally understood by those skilled in the art to which the invention pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

Hereinafter, a drop test device and a drop test method in an embodiment of the invention will be described with reference to the accompanying drawings.

FIG. 1 is a perspective view of an embodiment of the drop test device according to the invention.

Referring to FIG. 1, the drop test device DTD in the embodiment includes a clamp FXP and an impact plate IMP.

The clamp FXP grips a falling body FB that is drop tested by the drop test device DTD to evaluate whether the falling body FB has a defect depending on drop. The clamp FXP grips the falling body FB by applying a gripping force to the falling body FB and drops the falling body FB in a direction of fall DRF by releasing the gripping force, which is applied to the falling body FB, by a predetermined operation.

The falling body FB includes an electronic device. The drop test device DTD in the embodiment may be a device that evaluates whether the electronic device included in the falling body FB has a defect due to collision depending on drop. The electronic device included in the falling body FB may be a display device. The electronic device may be a display device used in a small or medium-sized product such as a personal computer ("PC"), a notebook computer, a personal digital terminal, an automobile navigation unit, a game machine, a smart phone, a tablet PC, or a camera. However, these are merely illustrative, and the electronic device may include a different display device other than the listed examples as long as not departing from the concept of the invention.

The electronic device included in the falling body FB may be a flexible display device having a plurality of usage modes. The drop test device DTD in the embodiment may be a drop test device capable of evaluation of the plurality of usage modes of the display device. In an embodiment, the electronic device included in the falling body FB may be an extensible display device that may be extended. The electronic device may correspond to a slidable display device among extensible display devices. The slidable display device may be a display device that may extend or retract a display area DA (FIGS. 5A and 5B) of a display module DM (FIGS. 5A and 5B) depending on sliding motion of a case. However, without being limited thereto, in another embodiment, the electronic device included in the falling body FB in the embodiment may be a foldable display device.

The clamp FXP may be connected to a support FP and may be spaced apart from the impact plate IMP by a predetermined height. The support FP including the clamp FXP connected thereto may have a predetermined height h along the direction of fall DRF. The height h of the support FP may be selected according to an environment in which the electronic device included in the falling body FB is actually used. In an embodiment, the height h of the support FP may be selected according to an environment in which a small or medium-sized display device is actually used, for example. Accordingly, it is possible to evaluate a presence or absence of a defect depending on impact when the falling body FB is dropped in the environment in which the small or medium-sized display device is actually used. In an embodiment, the support FP may have a height h of about 1.5 meter (m), for example.

The impact plate IMP may include an impact surface IMS with which the falling body FB gripped by the clamp FXP collides while dropping along the direction of fall DRF. The impact plate IMP may include a material with rigidity. In an embodiment, the impact plate IMP may include granite or metal.

Although not illustrated, the drop test device DTD in the embodiment may further include a controller that controls an operation of applying a gripping force to the falling body FB by the clamp FXP or an operation of releasing the gripping force by the clamp FXP. In addition, the drop test device DTD in the embodiment may further include a height adjustment device that adjusts the height of the support FP or adjusts the position of the clamp FXP connected to the support FP.

Figure 2A:
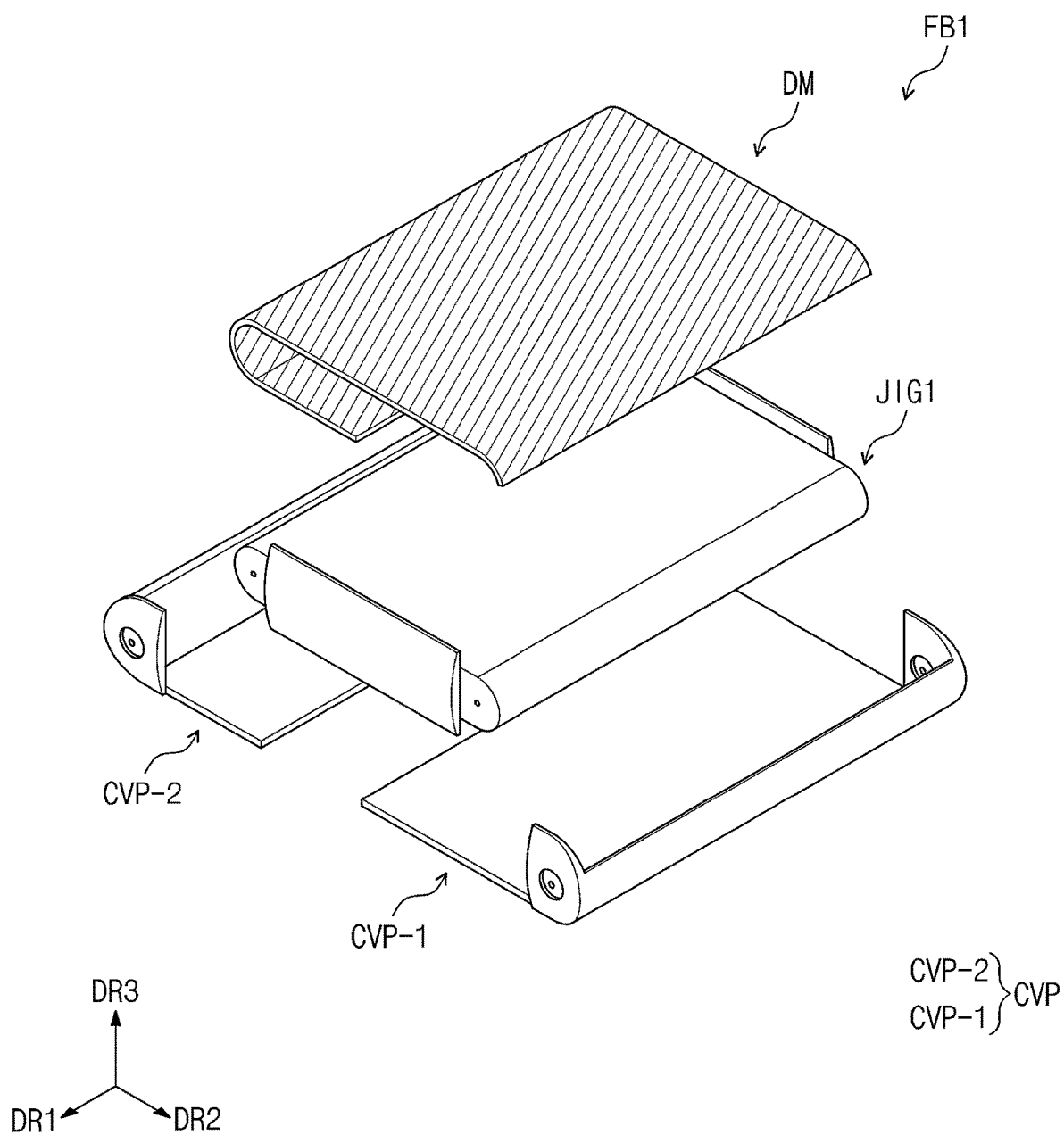
FIGS. 2A and 2B are exploded perspective views of an embodiment of falling bodies evaluated by the drop test device according to the invention.
Figure 2B:
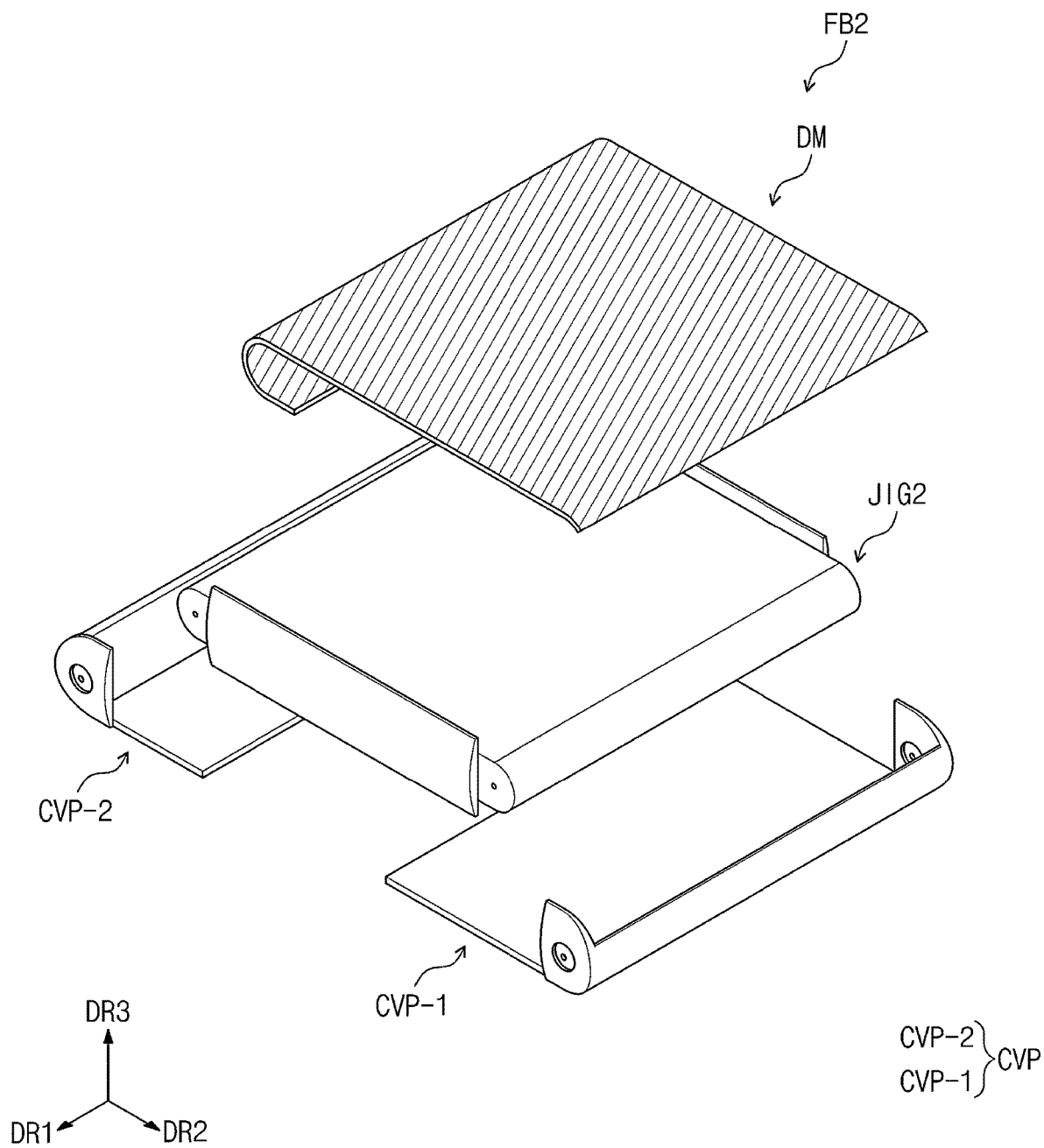
Figure 3A:
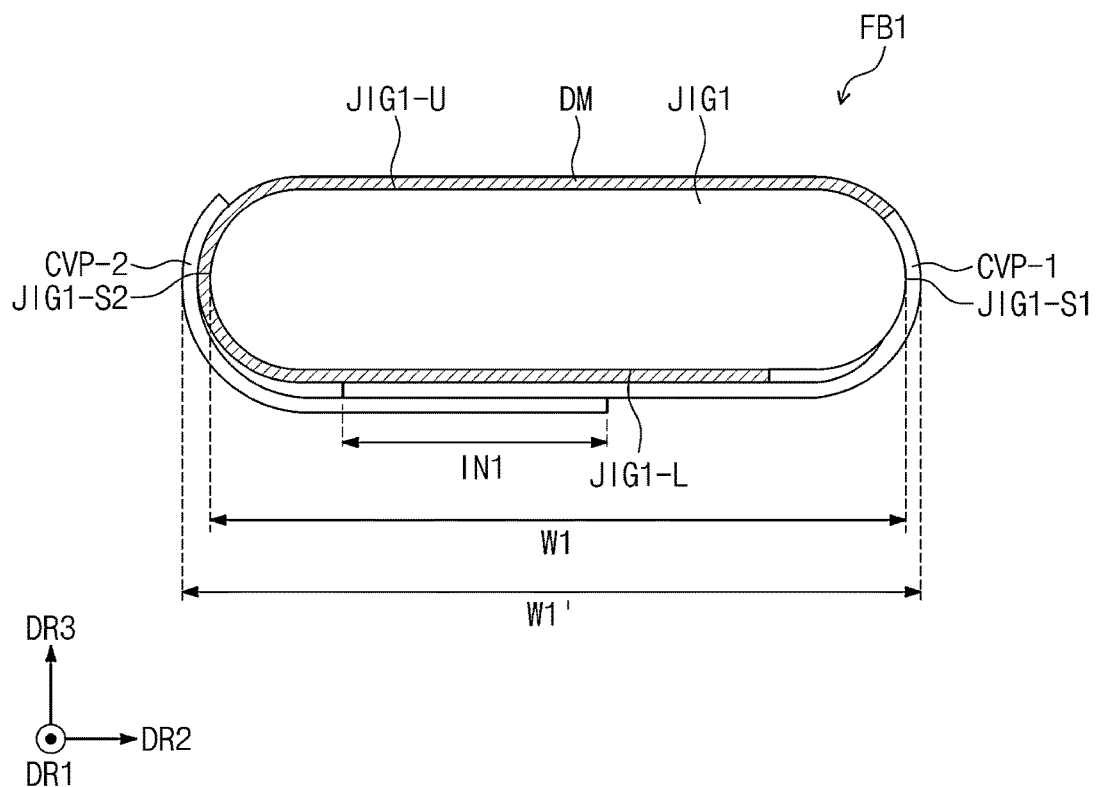
FIGS. 3A and 3B are cross-sectional views of an embodiment of the falling bodies evaluated by the drop test device according to the invention.
Figure 3B:
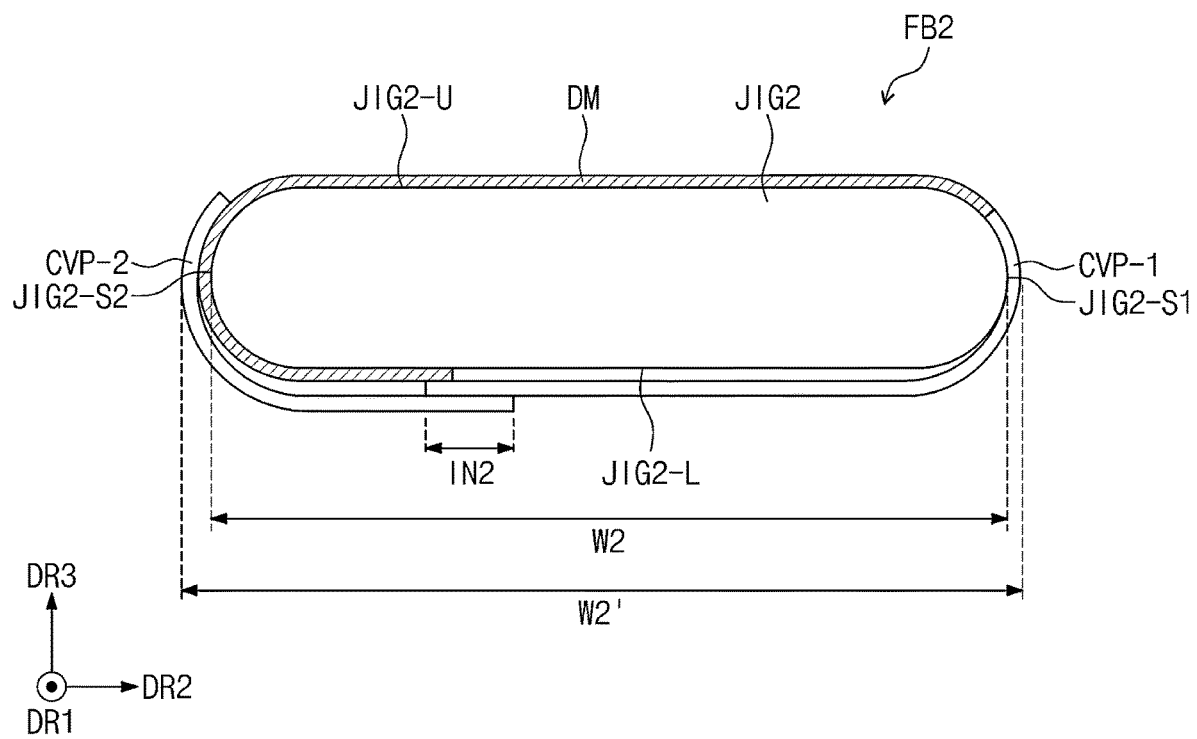

FIGS. 2A and 2B are exploded perspective views of an embodiment of falling bodies evaluated by the drop test device according to the invention. FIGS. 3A and 3B are cross-sectional views of an embodiment of the falling bodies evaluated by the drop test device according to the invention.

Figure 4B:
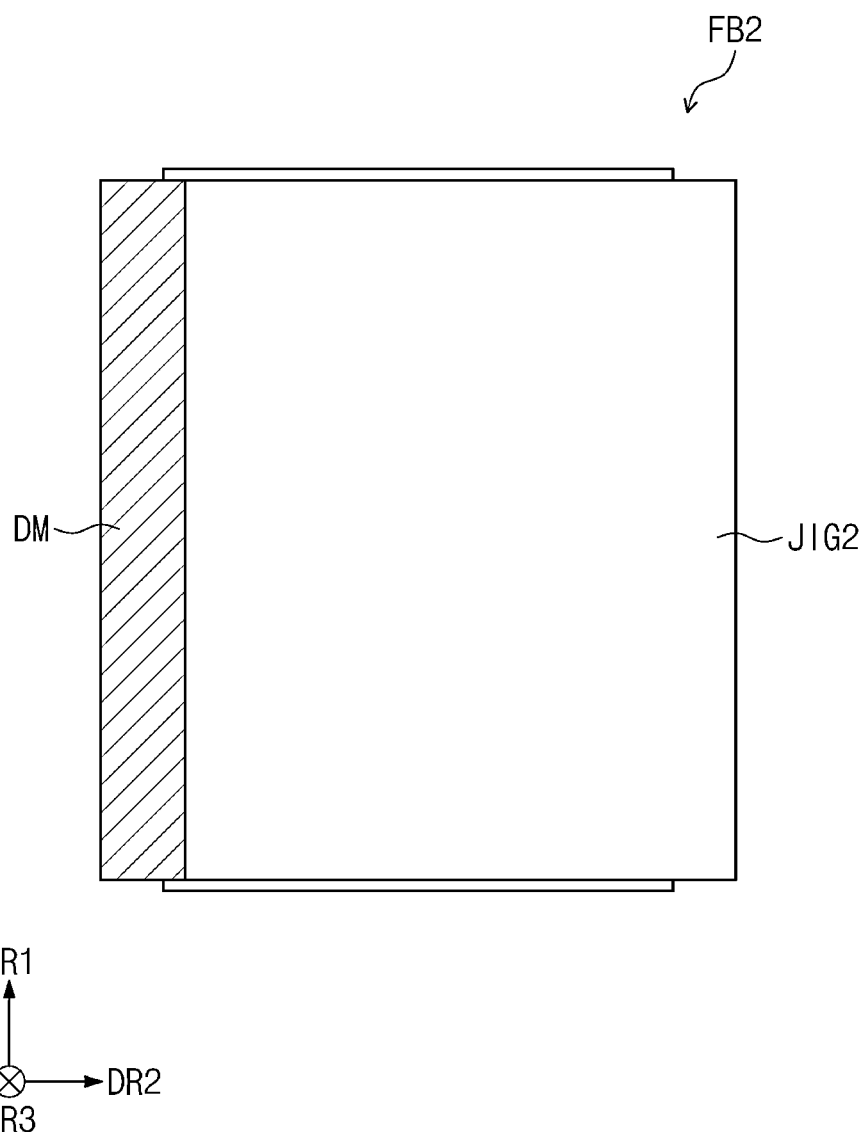

FIGS. 4A and 4B are rear views illustrating an embodiment of some components of the falling bodies evaluated by the drop test device according to the invention. FIGS. 4A and 4B illustrate rear views of shapes in which a display module is coupled with jigs in the falling bodies.

Referring to FIGS. 1, 2A, and 2B, the falling body FB in the drop test device DTD in the embodiment includes a first falling body FB1 illustrated in FIG. 2A and a second falling body FB2 illustrated in FIG. 2B. The drop test device DTD in the embodiment may drop one of the first falling body FB1 and the second falling body FB2 in one drop test. The drop test device DTD in the embodiment may evaluate drop impact of the first falling body FB1 by dropping the first falling body FB1 and may thereafter evaluate drop impact of the second falling body FB2 by dropping the second falling body FB2. That is, the drop test device DTD in the embodiment may be a device for evaluating drop impacts by continuously dropping the first falling body FB1 and the second falling body FB2 that are two different falling bodies FB.

Referring to FIGS. 2A and 2B, the first and second falling bodies FB1 and FB2 include a display module DM and jigs JIG1 and JIG2. The first falling body FB1 includes the first jig JIG1 and the display module DM coupled to the first jig JIG1. The second falling body FB2 includes the second jig JIG2 and the display module DM coupled to the second jig JIG2. The display module DM included in the first falling body FB1 and the second falling body FB2 may correspond to states in which the same display module operates in different modes.

The display module DM may be a flexible display module having a plurality of usage modes. In an embodiment, the display module DM may be a flexible display module that operates in a first mode and a second mode. In the first mode and the second mode of the display module DM, the display module DM may have display areas of different sizes from each other. The first mode and the second mode of the display module DM will be described below in more detail with reference to FIGS. 5A to 5D.

The first falling body FB1 includes the first jig JIG1 and the display module DM that is in the first mode and that is coupled to the first jig JIG1. The second falling body FB2 includes the second jig JIG2 and the display module DM that is in the second mode and that is coupled to the second jig JIG2.

Referring to FIGS. 2A, 2B, 3A, and 3B, the first jig JIG1 and the second jig JIG2 may have a plate shape parallel to a plane defined by a first direction DR1 and a second direction DR2 crossing the first direction DR1. However, the first jig JIG1 and the second jig JIG2 may have various shapes depending on the shape of the display module DM coupled to the first jig JIG1 and the second jig JIG2 and operating modes. Hereinafter, the term "plane" used herein may refer to a plane defined by the first direction DR1 and the second direction DR2, and the term "thickness" used herein may refer to a thickness in a third direction DR3 crossing the first direction DR1 and the second direction DR2.

The first jig JIG1 and the second jig JIG2 may include upper surfaces JIG1-U and JIG2-U, lower surfaces JIG1-L and JIG2-L respectively facing the upper surfaces JIG1-U and JIG2-U, and side surfaces connecting the upper surfaces JIG1-U and JIG2-U and the lower surfaces JIG1-L and JIG2-L. The first jig JIG1 may include the first upper surface JIG1-U, the first lower surface JIG1-L facing the first upper surface JIG1-U, and first side surfaces connecting the first upper surface JIG1-U and the first lower surface JIG1-L.

The second jig JIG2 may include the second upper surface JIG2-U, the second lower surface JIG2-L facing the second upper surface JIG2-U, and second side surfaces connecting the second upper surface JIG2-U and the second lower surface JIG2-L.

The side surfaces of the first jig JIG1 and the second jig JIG2 may include long side surfaces JIG1-S1, JIG1-S2, JIG2-S1, and JIG2-S2 extending in the first direction DR1 and short side surfaces extending in the second direction DR2. The first jig JIG1 and the second jig JIG2 may include the first long side surfaces JIG1-S1 and JIG2-S1 and the second long side surfaces JIG1-S2 and JIG2-S2 respectively facing the first long side surfaces JIG1-S1 and JIG2-S1. The first jig JIG1 may include the first-1 long side surface JIG1-S1 and the second-1 long side surface JIG1-S2, and the second jig JIG2 may include the first-2 long side surface JIG2-S1 and the second-2 long side surface JIG2-S2.

The first jig JIG1 and the second jig JIG2 may include a material having a predetermined rigidity. In an embodiment, the first jig JIG1 and the second jig JIG2 may include at least one of aluminum (Al), stainless steel ("SUS"), or polycarbonate. However, without being limited thereto, in another embodiment, the first jig JIG1 and the second jig JIG2 may include various materials capable of supporting the display module DM coupled thereto.

The display module DM may be coupled to the first jig JIG1 and the second jig JIG2 and may contact a surface of the first jig JIG1 and a surface of the second jig JIG2. In the first falling body FB1, the display module DM may contact the first upper surface JIG1-U and the second-1 long side surface JIG1-S2 of the first jig JIG1. The display module DM may also contact a part of the first lower surface JIG1-L. In the second falling body FB2, the display module DM may contact the second upper surface JIG2-U and the second-2 long side surface JIG2-S2 of the second jig JIG2. The display module DM may also contact a part of the second lower surface JIG2-L.

The first and second falling bodies FB1 and FB2 further include a cover CVP coupled to a lower portion of the display module DM and lower portions of the first and second jigs JIG1 and JIG2. The cover CVP may be a component that is coupled to the lower portion of the display module DM and the lower portions of the first and second jigs JIG1 and JIG2 to form a set environment similar to that when the display module DM is applied to an actual display device. Furthermore, the cover CVP may be a component that prevents the display module DM coupled to the first and second jigs JIG1 and JIG2 from being lifted. The cover CVP may include a material having a predetermined rigidity. In an embodiment, the cover CVP may include at least one of aluminum (Al), SUS, or polycarbonate. However, without being limited thereto, in another embodiment, the cover CVP may include various materials capable of preventing the display module DM coupled to the first and second jigs JIG1 and JIG2 from being lifted.

The cover CVP may cover parts of the lower surfaces JIG1-L and JIG2-L of the first and second jigs JIG1 and JIG2 and parts of the side surfaces thereof. In the first and second falling bodies FB1 and FB2, the cover CVP may include a plurality of covers. In an embodiment, the cover CVP may include a first cover CVP-1 and a second cover CVP-2. The first cover CVP-1 and the second cover CVP-2 may cover parts of the lower surfaces JIG1-L and JIG2-L of the first and second jigs JIG1 and JIG2 and parts of the long side surfaces JIG1-S1, JIG1-S2, JIG2-S1, and JIG2-S2 of the first and second jigs JIG1 and JIG2. The first cover CVP-1 may cover parts of the lower surfaces JIG1-L and JIG2-L of the first and second jigs JIG1 and JIG2 and parts of the first long side surfaces JIG1-S1 and JIG2-S1 thereof. The second cover CVP-2 may cover parts of the lower surfaces JIG1-L and JIG2-L of the first and second jigs JIG1 and JIG2 and parts of the second long side surfaces JIG1-S2 and JIG2-S2 thereof. The first cover CVP-1 may cover part of the display module DM disposed on the lower surfaces JIG1-L and JIG2-L. The second cover CVP-2 may cover parts of the display module DM disposed on the second long side surfaces JIG1-S2 and JIG2-S2 and the lower surfaces JIG1-L and JIG2-L.

In the first falling body FB1, the first cover CVP-1 may cover parts of the first lower surface JIG1-L and the first-1 long side surface JIG1-S1 of the first jig JIG1, and the second cover CVP-2 may cover parts of the first lower surface JIG1-L and the second-1 long side surface JIG1-S2 of the first jig JIG1. In the second falling body FB2, the first cover CVP-1 may cover parts of the second lower surface JIG2-L and the first-2 long side surface JIG2-S1 of the second jig JIG2, and the second cover CVP-2 may cover parts of the second lower surface JIG2-L and the second-2 long side surface JIG2-S2 of the second jig JIG2. FIGS. 3A and 3B illustrate examples that, in the first falling body FB1 and the second falling body FB2, the first cover CVP-1 and the second cover CVP-2 overlap each other in a cross-sectional view. However, without being limited thereto, in another embodiment, the first cover CVP-1 and the second cover CVP-2 may not overlap each other in a cross-sectional view.

The first jig JIG1 and the second jig JIG2 may have different widths from each other in the second direction DR2. In an embodiment, the first jig JIG1 and the second jig JIG2 may have the same width in the first direction DR1, may have the same thickness in the third direction DR3, and may have different widths from each other in the second direction DR2. In an embodiment, the first jig JIG1 may have a first width W1 in the second direction DR2, and the second jig JIG2 may have a second width W2 in the second direction DR2. The second width W2 may be greater than the first width W1. That is, the second jig JIG2 to which the display module DM in the second mode is coupled may have a greater width in the second direction DR2 than a width of the first jig JIG1 to which the display module DM in the first mode is coupled.

As the first jig JIG1 and the second jig JIG2 have different widths from each other in the second direction DR2, the first falling body FB1 and the second falling body FB2 may also different widths from each other in the second direction DR2. In an embodiment, the first falling body FB1 may have a width W1' in the second direction DR2, and the second falling body FB2 may have a width W2' in the second direction DR2, and the width W2' may be greater than the width W1'.

As the first jig JIG1 and the second jig JIG2 have different widths from each other in the second direction DR2, the areas of portions where the first cover CVP-1 and the second cover CVP-2 overlap each other in the plan view in the first falling body FB1 and the second falling body FB2 may also differ from each other. In the first falling body FB1, the first cover CVP-1 and the second cover CVP-2 may overlap each other by a first width IN1 in the second direction DR2. In the second falling body FB2, the first cover CVP-1 and the second cover CVP-2 may overlap each other by a second width IN2 in the second direction DR2. The first width IN1 may be greater than the second width IN2. Accordingly, the area by which the first cover CVP-1 and the second cover CVP-2 overlap each other in the plan view in the first falling body FB1 may be greater than the area by which the first cover CVP-1 and the second cover CVP-2 overlap each other in the plan view in the second falling body FB2.

Referring to FIGS. 3A, 3B, 4A, and 4B, as the first jig JIG1 and the second jig JIG2 have different widths from each other in the second direction DR2, the areas by which the display module DM is disposed on the lower portions of the first and second jigs JIG1 and JIG2 in the first falling body FB1 and the second falling body FB2 may differ from each other. As illustrated in FIGS. 4A and 4B, the area by which the display module DM is disposed on the lower portion of the first jig JIG1 in the first falling body FB1 may be greater than the area by which the display module DM is disposed on the lower portion of the second jig JIG2 in the second falling body FB2. In other words, in the first falling body FB1, a larger area of the display module DM may be disposed on the lower portion of the first jig JIG1 than in the second falling body FB2.

Figure 5A:
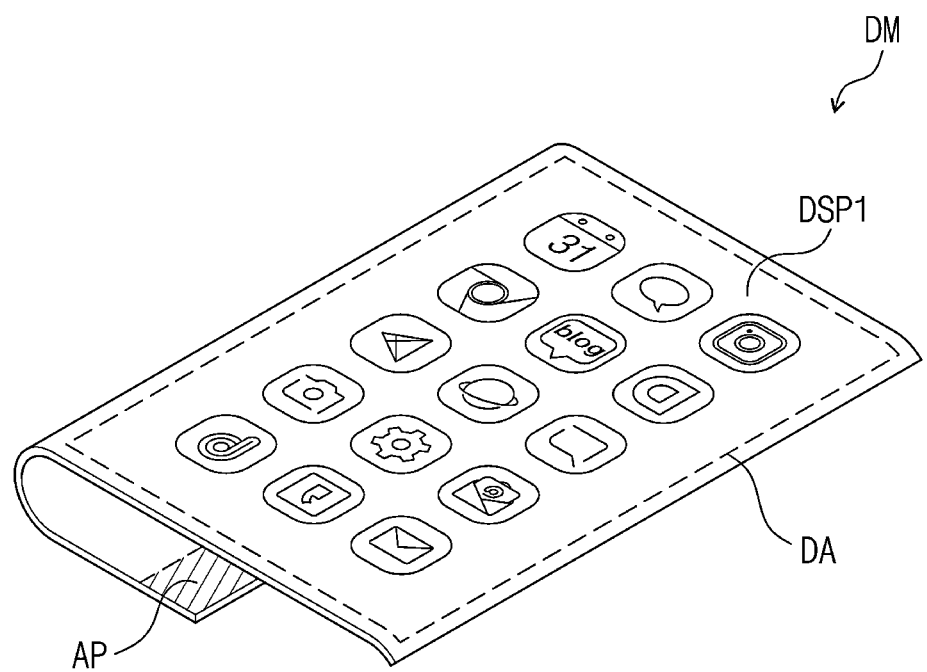
FIGS. 5A and 5B are perspective views illustrating an embodiment of usage modes of a display module included in a falling body.
Figure 5A:
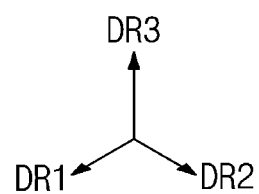
Figure 5B:
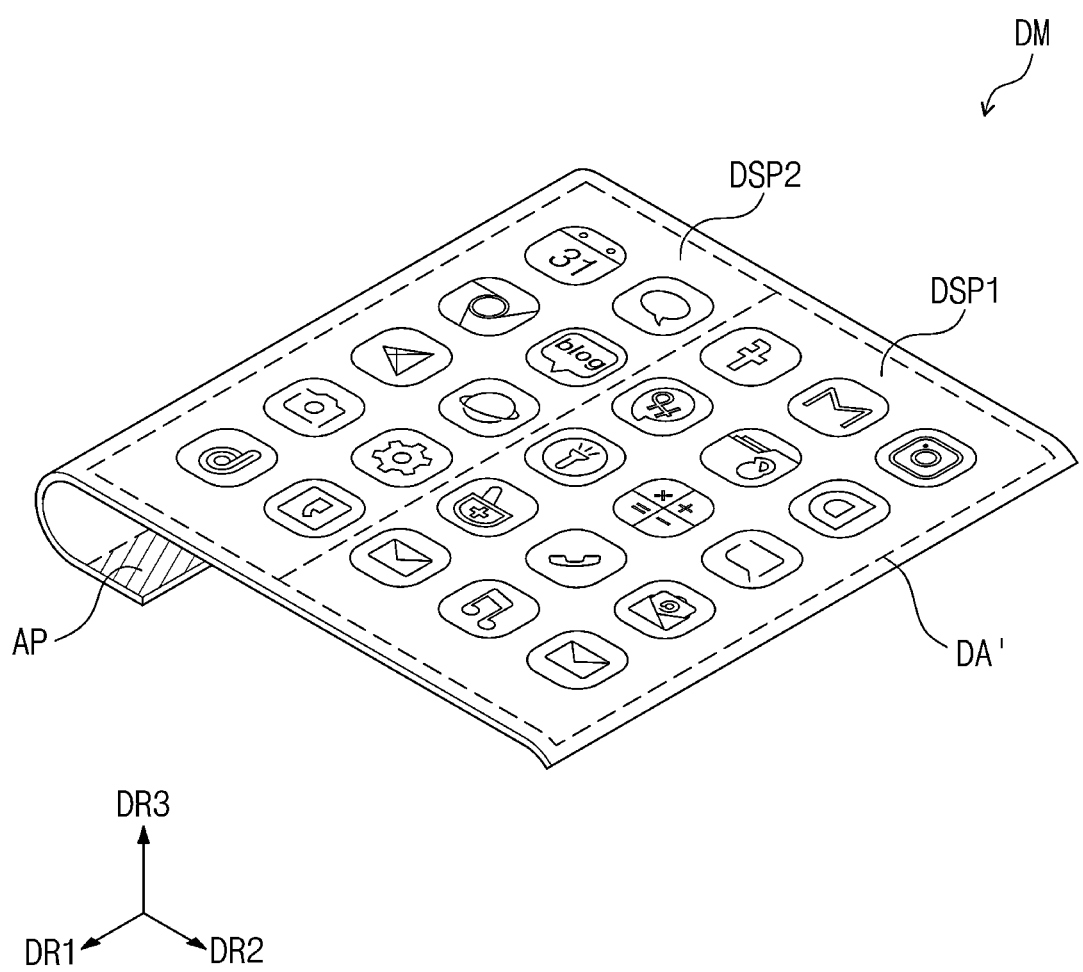
Figure 5C:
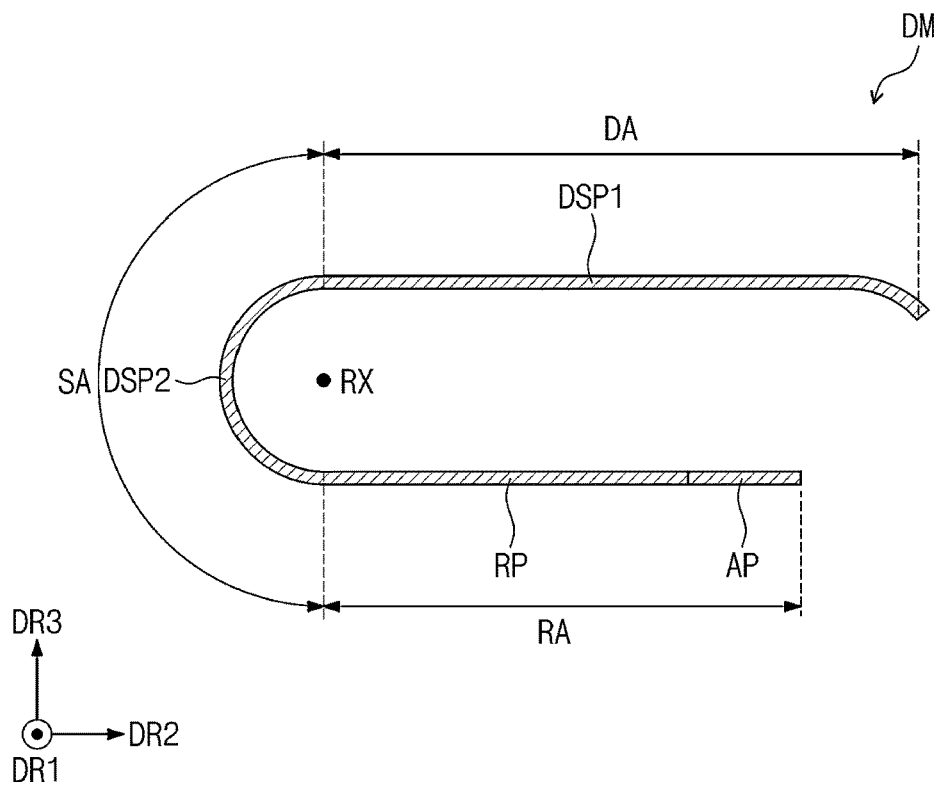
FIGS. 5C and 5D are cross-sectional views illustrating an embodiment of the usage modes of the display module included in the falling body.
Figure 5D:
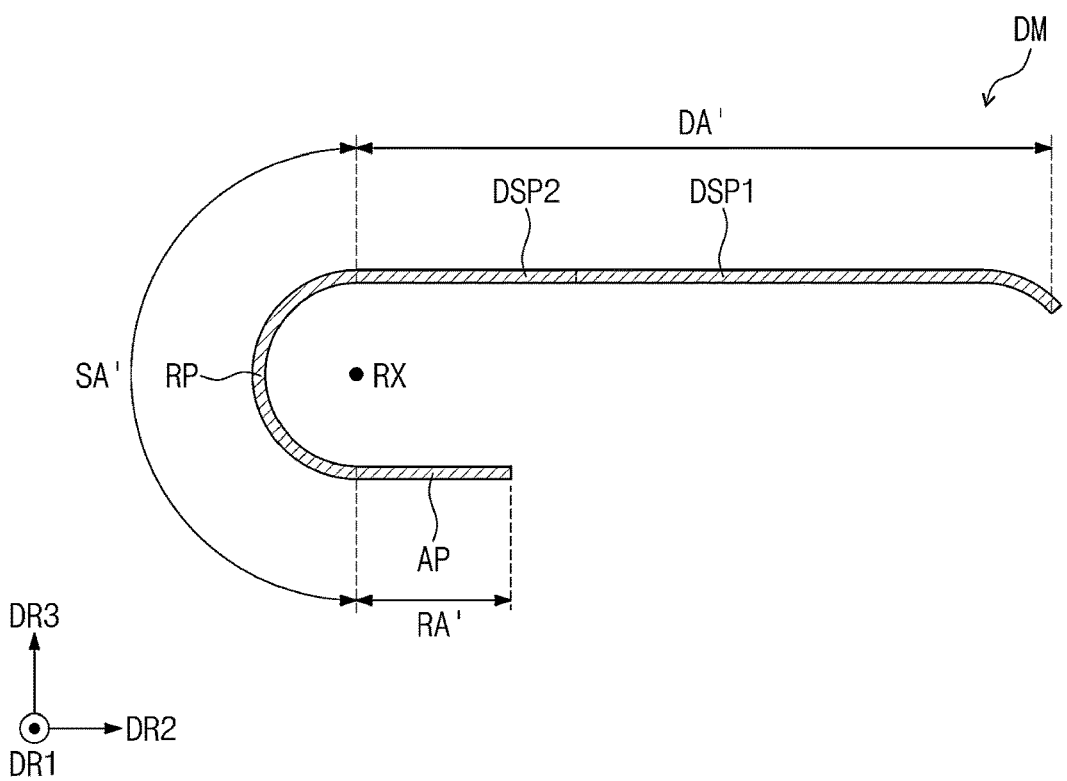

FIGS. 5A and 5B are perspective views illustrating usage modes of a display module included in a falling body. FIGS. 5C and 5D are cross-sectional views illustrating the usage modes of the display module included in the falling body. FIGS. 5A and 5C illustrate a perspective view and a cross-sectional view of the display module DM operating in a first mode. FIGS. 5B and 5D illustrate a perspective view and a cross-sectional view of the display module DM operating in a second mode.

Referring to FIGS. 5A to 5D, the display module DM in the embodiment may operate in the first mode and the second mode, and the sizes of display areas DA and DA' respectively in the first mode and the second mode may differ from each other. In an embodiment, the display area DA' of the display module DM in the second mode may have a larger size than a size of the display area DA of the display module DM in the first mode.

Referring to FIGS. 3A, 3B, and 5A to 5D, the display module DM in the embodiment may include a first display portion DSP1 and a second display portion DSP2.

As illustrated in FIGS. 5A and 5C, in the first mode, the display area DA of the display module DM may be defined by the first display portion DSP1. That is, the first display portion DSP1 may be disposed on the first upper surface JIG1-U of the first jig JIG1 and may display an image to the outside. In the first mode, the second display portion DSP2 may be disposed on the second-1 long side surface JIG1-S2 of the first jig JIG1 and may overlap a bending area SA without displaying a separate image. In this case, the second display portion DSP2 may have a predetermined curvature with reference to a reference point RX.

As illustrated in FIGS. 5B and 5D, in the second mode, the display area DA' of the display module DM may be defined by the first display portion DSP1 and the second display portion DSP2. That is, the first display portion DSP1 and the second display portion DSP2 may be disposed on the second upper surface JIG2-U of the second jig JIG2 and may display an image to the outside. As the first display portion DSP1 and the second display portion DSP2 display the image together in the second mode, the display area DA' in the second mode may be larger than the display area DA in the first mode.

Referring to FIGS. 5A to 5D, the display module DM may further include a rolling portion RP adjacent to the second display portion DSP2 and an adhesive portion AP adjacent to the rolling portion RP. The rolling portion RP may overlap a bending area SA' when the display module DM operates in the second mode. That is, in the second mode, the rolling portion RP may be disposed on the second-2 long side surface JIG2-S2 of the second jig JIG2. In this case, the rolling portion RP may have a predetermined curvature with reference to a reference point RX. The adhesive portion AP may be a portion of the display module DM that is attached to the lower surfaces of the first and second jigs JIG1 and JIG2. In the first mode, the adhesive portion AP and the rolling portion RP may be disposed in a rear area RA. That is, in the first mode, the adhesive portion AP and the rolling portion RP may be disposed under the first lower surface JIG1-L of the first jig JIG1. In the second mode, only the adhesive portion AP may be disposed in a rear area RA'. That is, in the second mode, only the adhesive portion AP may be disposed under the second lower surface JIG2-L of the second jig JIG2.

In the drop test device in the embodiment, drop tests are performed on a plurality of falling bodies to which jigs corresponding to usage forms of a display module in a plurality of modes are applied to correspond to the display module operating in the plurality of modes. Accordingly, it is possible to accurately evaluate a defect occurring in an environment in which the display module operating in the plurality of modes is actually used. Thus, reliability of the display module tested for a defect through the drop test device in the embodiment may be improved.

A drop test device in the related art is not provided with jigs corresponding to a display module operating in a plurality of modes. Accordingly, the drop test device in the related art performs a drop test through a jig corresponding to one mode, or performs a drop test on only the display module without a separate jig. When the display module is applied to an actual display device, the display module is provided in a state of being attached to base parts, such as a case and a driver, which are disposed under the display module. Therefore, in a case where a drop test is performed on only the display module, a presence or absence of a defect depending on drop impact when the display module is applied to an actual product may not be accurately evaluated.

In the drop test device in the embodiment, the display module that operates in the first mode and the second mode and that has a larger display area in the second mode than in the first mode is coupled to the first jig corresponding to the first mode to form the first falling body, and a drop test is performed on the first falling body. Furthermore, in the drop test device in the embodiment, the display module is coupled to the second jig corresponding to the second mode to form the second falling body, and a drop test is performed on the second falling body. Because the jigs are components made to simulate a base part to which the display module is attached when applied to an actual display device, the drop test device in the embodiment may accurately evaluate a defect occurring in an environment in which the display module operating in the plurality of modes is actually used.

Figure 6A:
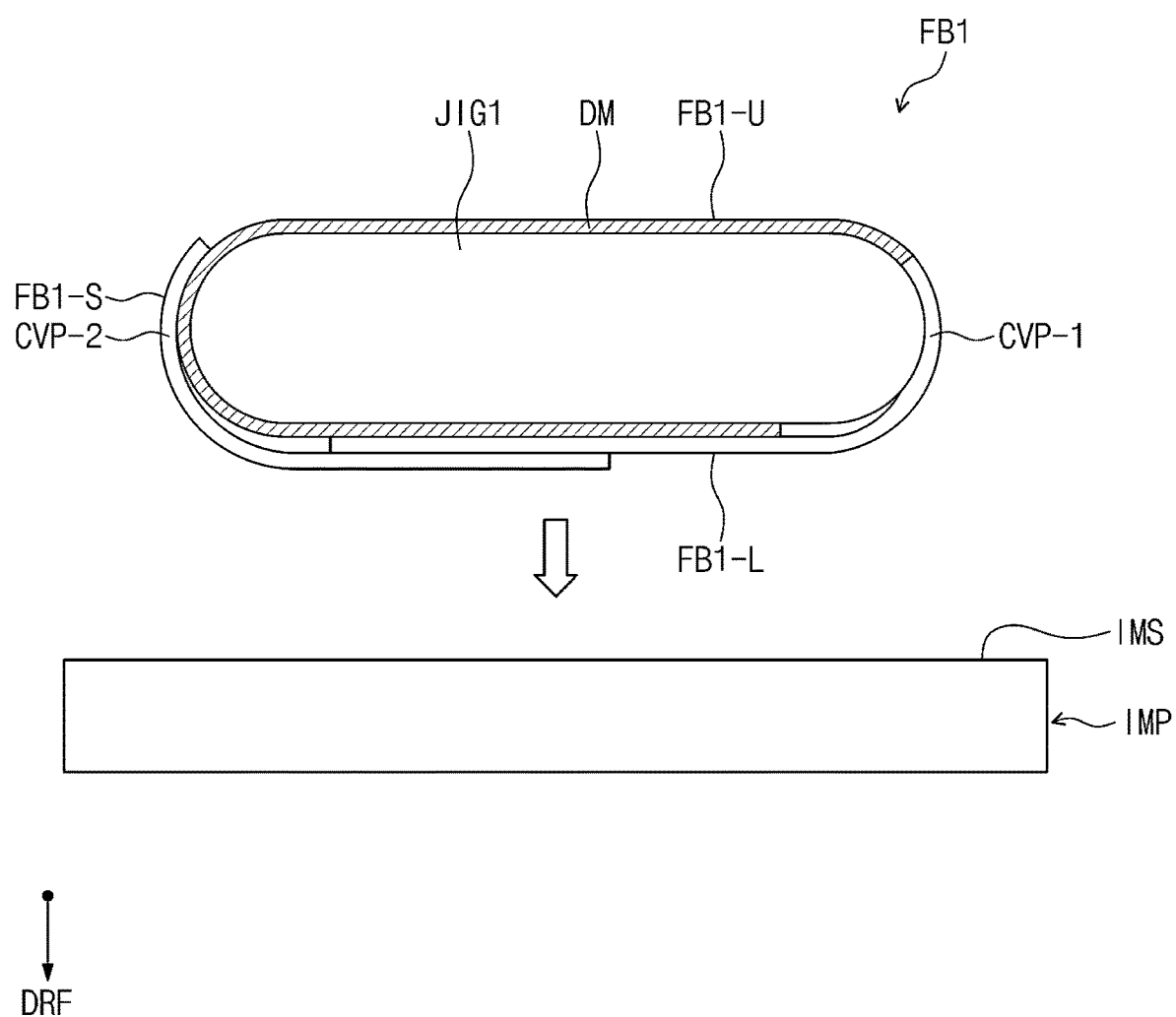
FIGS. 6A to 6C are cross-sectional views illustrating an embodiment of some operations of a drop test method.
Figure 6B:
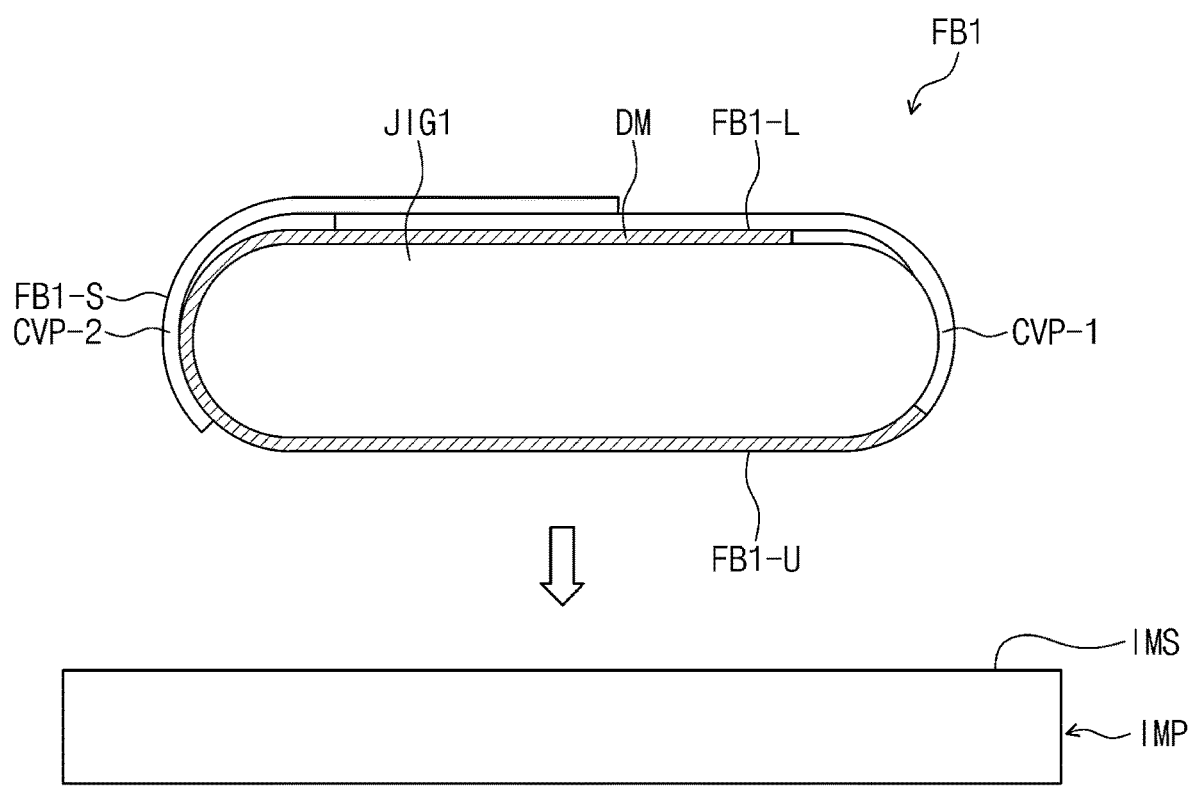
Figure 6C:
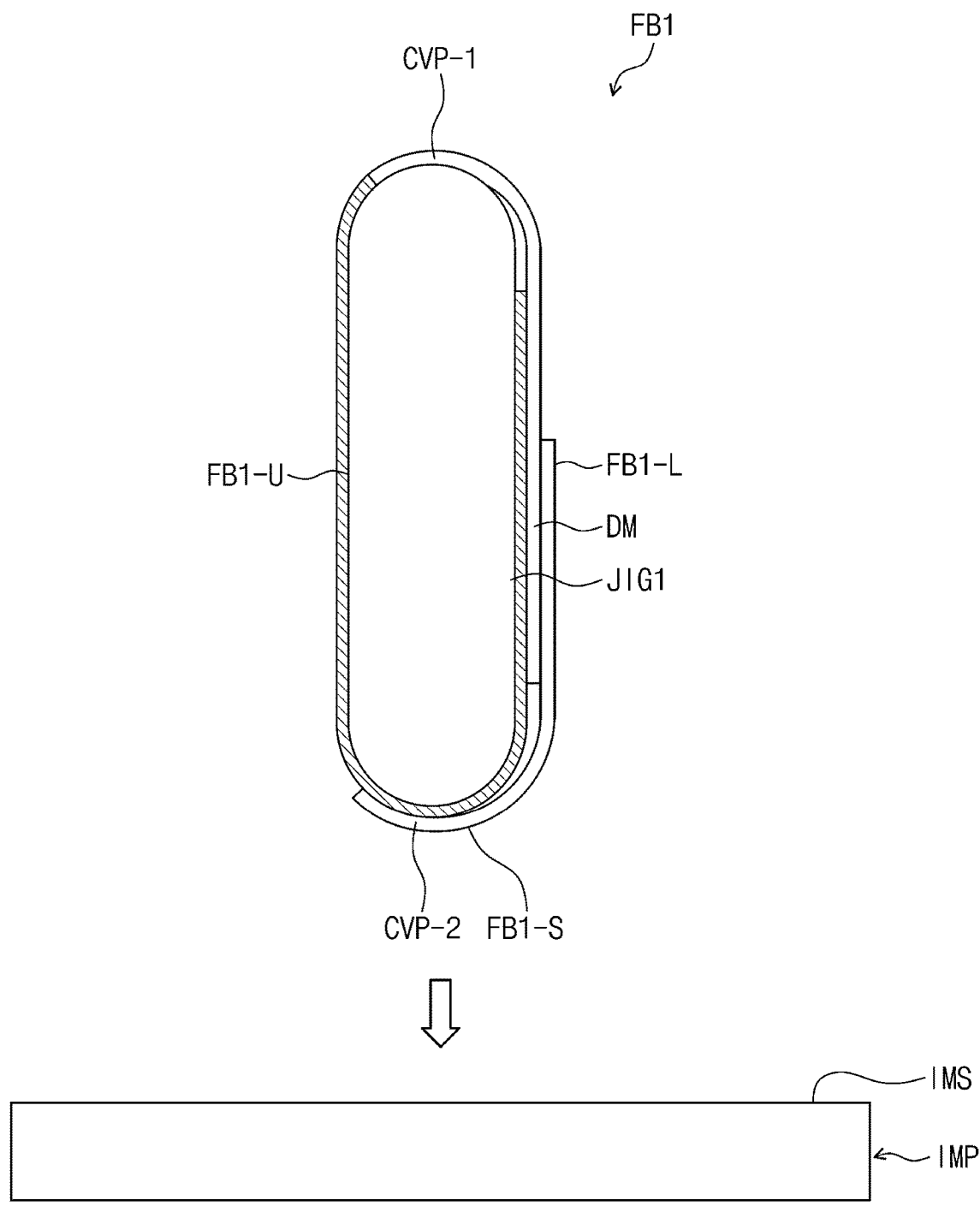
Figure 7A:
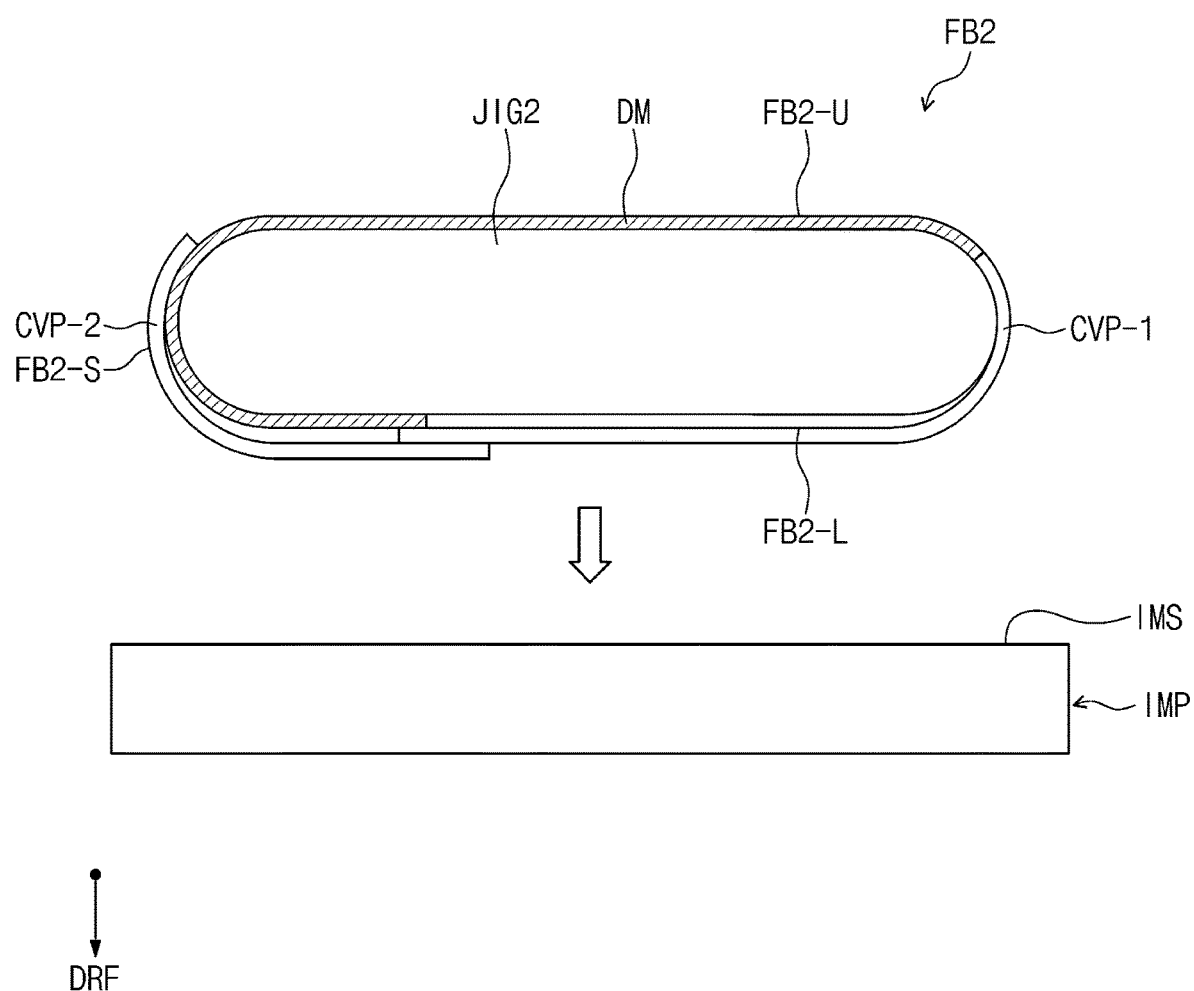
Figure 7C:
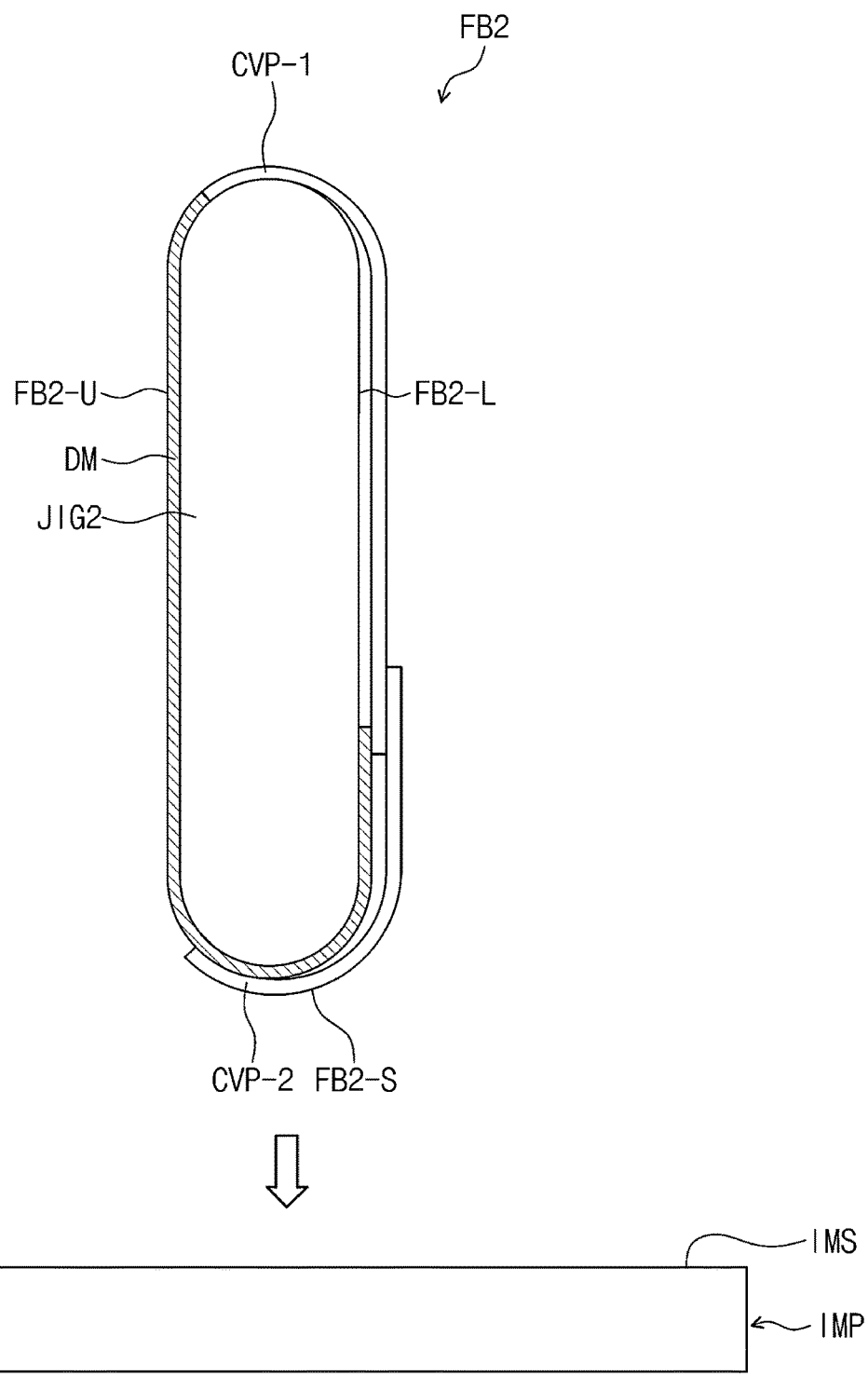

FIGS. 6A to 6C and 7A to 7C are cross-sectional views illustrating some operations of a drop test method. FIGS. 6A to 6C illustrate an operation of causing the first falling body FB1 to collide with the impact plate IMP by dropping the first falling body FB1. FIGS. 7A to 7C illustrate an operation of causing the second falling body FB2 to collide with the impact plate IMP by dropping the second falling body FB2. In describing the drop test method in the embodiment with reference to FIGS. 6A to 6C and 7A to 7C, components identical to those described above are provided with identical reference numerals, and detailed descriptions thereabout will be omitted.

Referring to FIGS. 1, 6A to 6C, and 7A to 7C, in the drop test method in the embodiment, drop impact is evaluated by dropping the falling body FB including the first falling body FB1 and the second falling body FB2. In the drop test method in the embodiment, one of the first falling body FB1 and the second falling body FB2 is dropped in one drop test. Drop impact of the first falling body FB1 is evaluated by dropping the first falling body FB1, and thereafter drop impact of the second falling body FB2 is evaluated by dropping the second falling body FB2.

The drop test method in the embodiment includes an operation of gripping the first falling body FB1 or the second falling body FB2 by the clamp FXP, an operation of dropping the first falling body FB1 or the second falling body FB2 by releasing a gripping force applied to the first falling body FB1 or the second falling body FB2, and an operation of causing the first falling body FB1 or the second falling body FB2 to collide with the impact plate IMP. In an embodiment, the drop test method includes an operation of gripping the second falling body FB2 by the clamp FXP, dropping the second falling body FB2, and causing the second falling body FB2 to collide with the impact plate IMP, after an operation of gripping the first falling body FB1 by the clamp FXP, dropping the first falling body FB1, and causing the first falling body FB1 to collide with the impact plate IMP. The operation of dropping the first falling body FB1 and the operation of dropping the second falling body FB2 may each be performed a plurality of times.

Referring to FIGS. 3A and 6A to 6C, the first falling body FB1 may include a first falling upper surface FB1-U, a first falling lower surface FB1-L, and a first falling side surface FB1-S. The first falling upper surface FB1-U of the first falling body FB1 may be a surface corresponding to the first upper surface JIG1-U of the first jig JIG1 and may be a surface on which the display module DM is exposed. The first falling lower surface FB1-L of the first falling body FB1 may be a surface corresponding to the first lower surface JIG1-L of the first jig JIG1 and may be a surface on which the first cover CVP-1 and the second cover CVP-2 are exposed. The first falling side surface FB1-S of the first falling body FB1 may include surfaces that correspond to the first-1 long side surface JIG1-S1 and the second-1 long side surface JIG1-S2 of the first jig JIG1. The first falling side surface FB1-S may include a surface on which one of the first cover CVP-1 and the second cover CVP-2 is exposed. Although not illustrated, the first falling side surface FB1-S may further include surfaces corresponding to the short side surfaces of the first jig JIG1, in addition to the surfaces that correspond to the first-1 long side surface JIG1-S1 and the second-1 long side surface JIG1-S2 of the first jig JIG1.

Referring to FIGS. 3B and 7A to 7C, the second falling body FB2 may include a second falling upper surface FB2-U, a second falling lower surface FB2-L, and a second falling side surface FB2-S. The second falling upper surface FB2-U of the second falling body FB2 may be a surface corresponding to the second upper surface JIG2-U of the second jig JIG2 and may be a surface on which the display module DM is exposed. The second falling lower surface FB2-L of the second falling body FB2 may be a surface corresponding to the second lower surface JIG2-L of the second jig JIG2 and may be a surface on which the first cover CVP-1 and the second cover CVP-2 are exposed. The second falling side surface FB2-S of the second falling body FB2 may include surfaces that correspond to the first-2 long side surface JIG2-S1 and the second-2 long side surface JIG2-S2 of the second jig JIG2. The second falling side surface FB2-S may include a surface on which one of the first cover CVP-1 and the second cover CVP-2 is exposed. Although not illustrated, the second falling side surface FB2-S may further include surfaces corresponding to the short side surfaces of the second jig JIG2, in addition to the surfaces that correspond to the first-2 long side surface JIG2-S1 and the second-2 long side surface JIG2-S2 of the second jig JIG2.

Referring to FIGS. 6A to 6C, the operation of dropping the first falling body FB1 may be repeated a plurality of times such that the upper surface, the lower surface, and the side surface of the first falling body FB1 each collide with the impact plate IMP. The operation of dropping the first falling body FB1 may include an operation of dropping the first falling body FB1 in the direction of fall DRF such that the first falling lower surface FB1-L collides with the impact surface IMS of the impact plate IMP as illustrated in FIG. 6A, an operation of dropping the first falling body FB1 in the direction of fall DRF such that the first falling upper surface FB1-U collides with the impact surface IMS of the impact plate IMP as illustrated in FIG. 6B, and an operation of dropping the first falling body FB1 in the direction of fall DRF such that the first falling side surface FB1-S collides with the impact surface IMS of the impact plate IMP as illustrated in FIG. 6C. In FIG. 6C, the first falling body FB1 is illustrated as being dropped such that one long side surface on which the second cover CVP-2 is disposed in the first falling body FB1 in the embodiment is directed downward. However, without being limited thereto, in another embodiment, the first falling body FB1 may be dropped such that the other long side surface of the first falling body FB1 or a short side surface of the first falling body FB1 is directed downward.

Referring to FIGS. 7A to 7C, the operation of dropping the second falling body FB2 may be repeated a plurality of times such that the upper surface, the lower surface, and the side surface of the second falling body FB2 each collide with the impact plate IMP. The operation of dropping the second falling body FB2 may include an operation of dropping the second falling body FB2 in the direction of fall DRF such that the second falling lower surface FB2-L collides with the impact surface IMS of the impact plate IMP as illustrated in FIG. 7A, an operation of dropping the second falling body FB2 in the direction of fall DRF such that the second falling upper surface FB2-U collides with the impact surface IMS of the impact plate IMP as illustrated in FIG. 7B, and an operation of dropping the second falling body FB2 in the direction of fall DRF such that the second falling side surface FB2-S collides with the impact surface IMS of the impact plate IMP as illustrated in FIG. 7C. In FIG. 7C, the second falling body FB2 is illustrated as being dropped such that one long side surface on which the second cover CVP-2 is disposed in the second falling body FB2 in the embodiment is directed downward. However, without being limited thereto, in another embodiment, the second falling body FB2 may be dropped such that the other long side surface of the second falling body FB2 or a short side surface of the second falling body FB2 is directed downward.

In the drop test method in the embodiment, the operations of dropping the first falling body FB1 and the second falling body FB2 are performed a plurality of times such that the upper surfaces, the lower surfaces, and the side surfaces of the first falling body FB1 and the second falling body FB2 each collide with the impact plate IMP. Accordingly, it is possible to accurately evaluate defects occurring when the display module DM is dropped in various directions in an actual usage environment.

As described above, in the embodiments of the invention, a defect occurring in an environment in which a flexible display module operating in a plurality of modes is actually used may be accurately evaluated. Accordingly, reliability of the display module tested for a defect through the drop test device and the drop test method in the embodiments may be improved.

While the invention has been described with reference to embodiments thereof, it will be apparent to those of ordinary skill in the art that various changes and modifications may be made thereto without departing from the spirit and scope of the invention as set forth in the following claims.

What is claimed is:

1. A drop test device comprising:
a falling body including:
a display module which operates in a first mode and a second mode; and
a jig to which the display module is coupled, the jig including:
a first jig to which the display module in the first mode is coupled; and
a second jig to which the display module in the second mode is coupled;
a clamp which grips the falling body and drops the falling body by releasing, by a predetermined operation, a gripping force applied to the falling body; and
an impact plate including an impact surface with which the falling body collides,
wherein a first size of a display area of the display module in the first mode is smaller than a second size of the display area of the display module in the second mode in a plan view,
wherein each of the first jig and the second jig has a plate shape parallel to a plane defined by a first direction and a second direction crossing the first direction,
wherein the second jig has a first width greater than a first width of the first jig in the second direction, and has a second width equal to a second width of the first jig in the first direction,
wherein the falling body further includes a cover coupled to a lower portion of the display module and a lower portion of one of the first jig and the second jig,
wherein each of the first jig and the second jig includes an upper surface on which the display module is disposed and a lower surface which faces the upper surface,
wherein the cover covers at least part of the lower surface,
wherein each of the first jig and the second jig further includes a side surface which connects the upper surface and the lower surface,
wherein the side surface includes a long side surface extending in the first direction and a short side surface extending in the second direction,
wherein the cover covers at least part of the long side surface of the one of the first jig and the second jig,
wherein the long side surface includes a first long side surface and a second long side surface which faces the first long side surface, and
wherein the cover includes a first cover which covers the first long side surface of the one of the first jig and the second jig and a second cover which covers the second long side surface of the one of the first jig and the second jig.

2. The drop test device of claim 1, wherein an area by which the first cover and the second cover coupled to the second jig overlap each other in the plan view is smaller than an area by which the first cover and the second cover coupled to the first jig overlap each other in the plan view.

3. The drop test device of claim 1, wherein the display module includes a first display portion and a second display portion adjacent to the first display portion,
wherein in the first mode, the first display portion defines the display area of the display module, and
wherein in the second mode, the first display portion and the second display portion define the display area.

4. The drop test device of claim 3, wherein the display module further includes a rolling portion adjacent to the second display portion,
wherein in the first mode, the rolling portion is disposed under the first jig, and
wherein in the second mode, the rolling portion is disposed on the outer side surface of the second jig.

5. The drop test device of claim 4, wherein the display module further includes an adhesive portion adjacent to the rolling portion, the adhesive portion being attached to the lower surface of each of the first jig and the second jig.

6. The drop test device of claim 1, further comprising:
a support to which the clamp is connected, the support having a predetermined height along a direction in which the falling body drops.

7. The drop test device of claim 1, wherein the impact plate includes granite or metal.

* * * * *